US008566266B2

(12) United States Patent
Nikovski et al.

(10) Patent No.: US 8,566,266 B2
(45) Date of Patent: Oct. 22, 2013

(54) METHOD FOR SCHEDULING THE OPERATION OF POWER GENERATORS USING FACTORED MARKOV DECISION PROCESS

(75) Inventors: Daniel N. Nikovski, Brookline, MA (US); Weihong Zhang, Saint Louis, MO (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 479 days.

(21) Appl. No.: 12/870,703

(22) Filed: Aug. 27, 2010

(65) Prior Publication Data

US 2012/0054139 A1    Mar. 1, 2012

(51) Int. Cl.
*G06N 5/02*    (2006.01)
(52) U.S. Cl.
USPC .......................................................... 706/46
(58) Field of Classification Search
USPC ........................................................ 706/45, 46
See application file for complete search history.

(56) References Cited

U.S. PATENT DOCUMENTS

| 5,708,590 | A | 1/1998 | Slutsker et al. | |
| 7,193,557 | B1* | 3/2007 | Kovacich et al. | 342/89 |
| 2008/0154810 | A1* | 6/2008 | Ye et al. | 706/13 |
| 2009/0292402 | A1 | 11/2009 | Cruickshank | |

FOREIGN PATENT DOCUMENTS

EP    1363219 A1    11/2003

OTHER PUBLICATIONS

"An Intelligent Assistant for Power Plants based on Factored MDPs", A. Reyes, M. T. J. Spaan, L. E. Sucar, Intelligent System Applications to Power Systems, 2009. ISAP '09. 15th International Conference, Nov. 8-12, 2009, pp. 1-6.*
"Probabilistic Constrained Load Flow Considering Integration of Wind Power Generation and Electric Vehicles", John G. Vlachogiannis, IEEE Transactions on Power Systems, vol. 24, No. 4 Nov. 2009, pp. 1808-1817.*
"Parallel Branch-and-Bound Formulations for and/or Tree Search" Vipin Kumar, IEEE Transactions on Pattern Analysis and Machine Intelligence, vol. PAMI-6, No. 6, Nov. 1984, pp. 768-778.*
"Power Plant Operator Assistant: An Industrial Application of Factored MDPs", A. Reyes, P. H. Ibarguengoytia, L. E. Sucar, MICAI 2004: Advances in Artificial Intelligence, Lecture Notes in Computer Science vol. 2972, 2004, pp. 565-573.*
Reyes A et al. "An Intelligent Assistant for Power Plants Based on Factored MDPs", Intelligent System Applications to Power Systems. 2009. ISAP '09. 15th International Conference on, IEEE, Piscataway, NJ, USA, Nov. 8, 2009, p. 1-6, XP031579988, ISBN: 978-1-4244-5097-8.

(Continued)

*Primary Examiner* — Kakali Chaki
*Assistant Examiner* — Mai T Tran
(74) *Attorney, Agent, or Firm* — Gene Vinokur; Dirk Brinkman

(57) ABSTRACT

An optimal conditional operational schedule for a set of power generators is determined by constructing states and transitions of a factored Markov decision process (fMDP) from a target electrical demand and generator variables. A cost function for the fMDP is constructed based on the electrical demand, the generator variables, and a risk coefficient. Then, the fMDP is solved to obtain the optimal conditional operational schedule.

18 Claims, 3 Drawing Sheets

(56) References Cited

OTHER PUBLICATIONS

Salehian A: 'Rational Decision Making Under Uncertanties of Transmission Network Environment', Power Engineering Society General Meeting, 2005. IEEE San Francisco, CA; USA, Jun. 12, 2005, p. 443-448, XP010821424, DOI: 10.1109/PES.2005.1489168, ISBN: 978-0-7803-9157-4.

Reyes A et al.; "An Operation Auxiliary System for Power Plants Based on Decision-Theoretic Plannint", Intelligent Systems Application to Power Systems, International Conference on Processings, Nov. 6, 2005, p. 286-290, XP010897223, DOI: 10.1109/ISAP.2005.1599277, ISBN: 978-1-59975-174-0.

Bin-Sheng Liu et al.; "A Forecast Method of Economic Data and Its Application", Management and Service Science, 2009 MASS' 09. International Conference on IEEE, Piscataway, NJ, USA, Sep. 20, 2009, p. 1-4, XP031553528, ISBN: 978-1-4244-4638-4.

* cited by examiner

50

141

METHOD FOR SCHEDULING THE OPERATION OF POWER GENERATORS USING FACTORED MARKOV DECISION PROCESS

FIELD OF THE INVENTION

The field of the invention relates generally to power generation, and more particularly to scheduling the operation of power generators.

BACKGROUND OF THE INVENTION

It is desired to schedule the operation of power generators, e.g., nuclear, coal, oil, gas, hydroelectric, solar, and wind. The generators are connected to consumers via electrical grids. The grids can cover continents. An objective of the operational scheduling is to generate a projected amount of electrical power for the consumers, while minimizing production cost and risk of power shortages.

The operational schedule includes a sequence of operational periods (steps), typically of a one hour length. During each step, it is necessary to determine which generators should be on, and which should be off, and how much electricity should be produced by each generator that is on.

The planning horizon, i.e., the duration of the schedule, is typically between one day and one week. Finding the operational schedule that is optimal among all possible schedules is a difficult computational problem due to the very large number of possible generator combinations, schedules that have to be considered, the differences in the operational costs of individual generators, the reliability and variations in output, and various existing operational constraints.

A large number of these constraints are temporal in nature, which turns the operational scheduling into a sequential decision making problem. For example, some generators have minimal and maximal on and off times, as well as limits on how fast the output of the generators can increase or decrease. That is why turning a generator on or off has consequences that extend over long periods of time, and such decisions constitute a commitment to use (or not) the generator for multiple time steps.

For this reason, deciding which generators to turn on or off is commonly known as the unit commitment problem in power generation. After a set of generators have been committed to be on at a specific moment in time, the optimal output to be produced by each generator has to be determined. Additional constraints must also be taken into consideration, such as the minimal and maximal output a generator can produce. This nested optimization problem is known as an economic dispatch problem.

Given a set s of operational generators, which is a subset of all available generators, and a target electrical demand d, it is assumed that $F=f(s, d)$ returns the total expected cost of producing the electrical demand d by the generators in the set s, and $G=g(s, d)$ returns an expected risk (probability) of not being able to meet the demand with this set of generators. If the generators in the set s cannot meet the demand d, for example because d exceeds the sum of the individual maximal outputs of the generators in the set s, then it is assumed that the cost F is equal to the cost of running the generators at full capacity, and the risk G of failure to meet demand is one.

For most practical problems, the number of all possible schedules is prohibitively large to search exhaustively. If N generators are available, then there are $2^N$ possible subsets of on generators during any time step. If there are a total of M time steps in the planning horizon, e.g., M=24 for a planning horizon of one day and time step of one hour, then the total number of all possible schedules is $2^{N \cdot M}$. The tremendous combinatorial complexity of the operational scheduling problem requires a more efficient computational method for an approximate solution.

One simple method is to place all generators in a priority list ordered by the relative cost of output electricity per generator when operating at maximal capacity, such that the generator with a lowest cost has a highest priority. Given the expected demand $d_t$ for the time step t, the available generators are operated according to the priority list, possibly committing new generators that were off if $d_t > d_{t-1}$, or possibly decommitting generators that were on if $d_t < d_{t-1}$.

Minimal on and off times can be accommodated by modifying the priority list to exclude those generators that must be turned on or off to satisfy these constraints. While feasible, such a method of operational scheduling is far from optimal, and more advanced techniques based on dynamic programming, Lagrange relaxation, branch-and-bound, are known.

One approach decomposes the problem into stages corresponding to the individual time steps of the schedule, and uses dynamic programming to determine recursively the optimal cumulative cost-to-go, until the end of the schedule, for every feasible combination (subset) of generators for the current stage.

Such a procedure reduces the computational complexity of the problem, because the computational complexity is linear in the number of stages (steps), and quadratic in the number of feasible combinations for every stage. However, the number of feasible combinations ($2^N$) is still exponential in the number of available generators N. The heuristics to reduce that number of feasible combinations can possibly lead to suboptimal solutions. Furthermore, if the state of a generator is represented by a Boolean variable (on/off), then it is not be possible to accommodate requirements for minimum on and off times, and limits on ramping rates.

When future power demand is completely known for the entire duration of the planning period, and the operator of the power generators has full control over how much electricity a generator generates after the generator has been turned on, the optimal operating schedule can be determined in advance, and executed accordingly as time advances.

In practice however, demand cannot be completely known. There are always inaccuracies in forecasting, as well as random variations due to future events, e.g., higher load for air conditioners on a day that is warmer than expected. Similarly, the output of generators cannot be completely known. For example, any generator can malfunction with some probability. In addition, the output of renewable power sources, such as photovoltaic panels and wind turbines, can vary greatly, because the output is governed by uncontrollable natural forces.

Although less severe than complete generator malfunctions, the variability of renewable power sources is an everyday reality, and affects operational scheduling even more significantly. In the past, one practical way to plan for deviations from expected demand and supply has been to include a safety margin of extra capability to produce power by means of the committed generators, also called a spinning reserve. That is, the operational scheduling plans for a slightly higher power output. Determining how much this safety margin should be, and how it should be distributed among the operational generators, is not an easy problem, and is subject to regulations.

Sometimes a rule of thumb is used to provide for a small safety margin of expected demand, e.g., 3%. In other cases, utilities have to compensate for a possible loss of the largest generator. However, that approach is largely heuristic, and is not likely to work in the future, when renewable energy sources become more widespread. An alternative approach is to recognize that the uncertainty in power demand and generator supply make the problem stochastic, i.e., probabilistic and random, see e.g., U.S. Patent Application 20090292402, "Method & apparatus for orchestrating utility power supply & demand in real time using a continuous pricing signal sent via a network to home networks & smart appliances," Nov. 26, 2009.

A stochastic operational scheduler determines a schedule that can accommodate future variations of supply and demand, and provides a safety margin implicitly, by planning for all possible contingencies. One significant difficulty associated with that approach has been how to represent all these possible contingencies, and how to plan for them. One model organizes all future possible realizations of the system (called scenarios) as a tree of scenario bundles. However, that model for representing stochasticity is limited to only a small number of scenarios, whereas in a practical system the future can be realized in an infinite number of ways.

SUMMARY OF THE INVENTION

The embodiments of the invention provide a method for determining an optimal conditional operational schedule for a set of power generators under stochastic demand for electrical power, and stochastic output of uncontrollable generators, e.g., renewable power sources such as photovoltaic panels and wind turbines.

Unlike conventional operational schedules, which are fixed in advance, a conditional operational schedule depends on a future state of observable random variables (demand and output), and can result in different actual schedules depending on the observed outcomes for these variables. The scheduler explicitly balances the operational cost of electricity generation with the risk of not being able to meet future electricity demand.

DETAILED DESCRIPTION OF THE PREFERRED EMBODIMENTS

Figure 1:
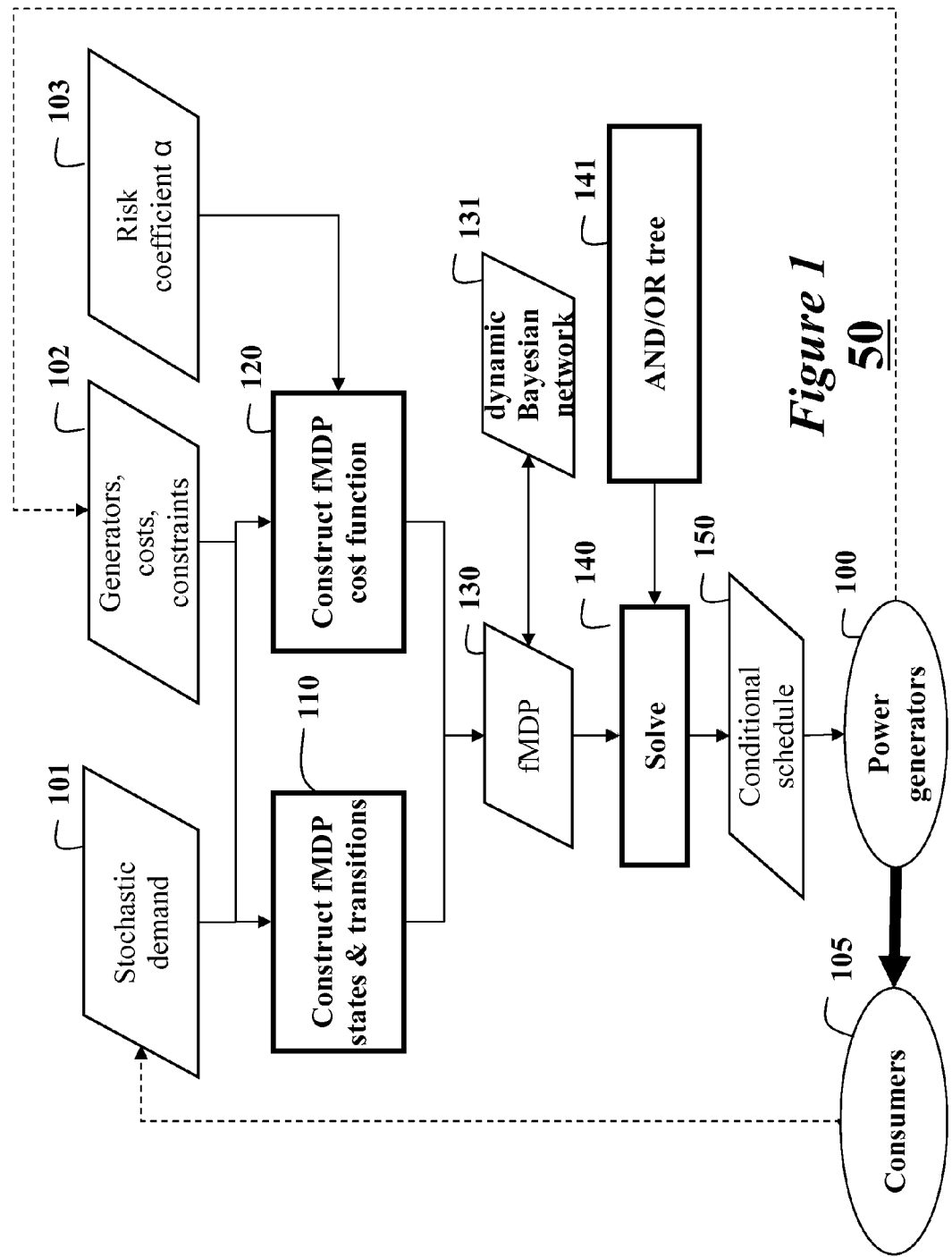
FIG. 1 is a flow diagram of a method for determining an optimal conditional operational schedule for a set of N power generators according to embodiments of the invention.

As shown in FIG. 1, the embodiments of the invention provide a method 50 for determining an optimal conditional operational schedule 150 for a set of N power generators 100 under stochastic demand 101 for electrical power, and stochastic output for a subset of the generators. The power generators supply power to consumers 105. The method can be implemented in a processor connected to a memory and input/output interfaces as known in the art. The method uses a factored Markov decision process (fMDP) 130.

Input to the method includes the stochastic (random) demand d 101, generator related variables, such as operating costs and constraints 102, and a risk coefficient α 103. The demand and generator related variables are used to construct 110 the states and transitions of the fDMP. A cost function of the fMDP is also constructed 120 from the variables 101-102 and the risk coefficient.

The method represents a power generation system including the multiple generators 100 by the fMDP 130. The fMDP represents a complex state space using state variables and a transition model using a dynamic Bayesian network (DBN) 131.

Figure 3:
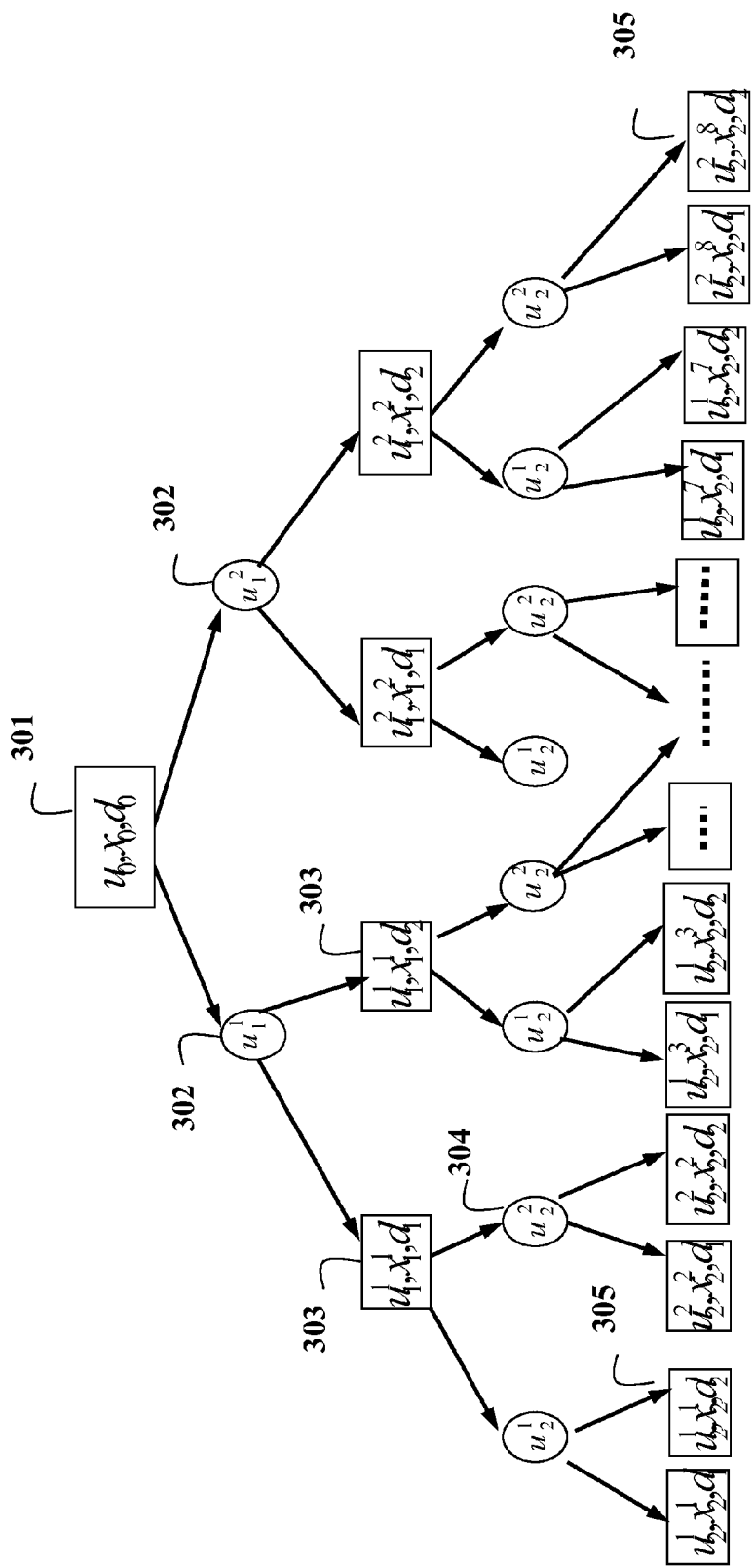
FIG. 3 shows an AND/OR tree used to compute the optimal conditional operational schedule according to embodiment of the invention.

The method determines the optimal conditional operational schedule 150 by solving 140 the fMDP using AND/OR trees 141, see FIG. 3.

Markov Decision Process

A Markov decision process (MDP) could be used to represent a system, wherein states evolve probabilistically over time. Typically, the MDP is described by a four-tuple (X, A, R, P), where X is a finite set of states x, A is a finite set of actions a, R is a reward function such that R(x, a) represents the reward (i.e., cost) if action a is taken in state x; and P is a Markovian transition model, where P(x'|x, a) represents the probability of transitioning to a state x' if action a is taken in state x.

The MDP could be used to represent the power generation system, for example by representing each possible combination of the generators by the state x, each combination of decisions regarding the state of the generators in the next time step by the action a, the cost of operating the generators in state x for the current period, and switching to a successor state x' of the generators according to the action a at the end of the period according to the reward function R(x, a).

To make the transition function Markovian, the state of each generator is not represented by a Boolean (on/off) variable, but by a multinomial variable representing a number of time steps the generator has been on or off. This is necessary to ensure compliance with operating constraints regarding the minimal or maximal time a generator should be on or off.

If a generator should be on for at least (or at most, whichever is greater) L time steps, and off for at least (or at most, whichever is greater) l time steps, the state is represented by one of L+l values. Correspondingly, the state of the entire generation system that includes N generators can be one of $(L+l)^N$ combinations. If planning is to take place over M time steps, then the total number of states |X| of the MDP is $M(L+l)^N$.

However, for most practical problems, e.g., when L=l=5, N=20, M=24, $|X|=24\times10^{20}$. Thus, the resulting conventional MDP is impossible to solve, because existing exact methods for solving the MDP are computationally feasible only when |X| is limited to several million states. In addition, the MDP is cumbersome to construct and maintain.

Factored Markov Decision Process

Therefore, the method according to the preferred embodiments of the invention uses the fMDP 130. In the fMDP, the set of states of the process is implicitly described by an assignment to a set of individual random variables $X=\{X_1, X_2, \ldots, X_n\}$, where each state variable $X_i$ has values in a finite domain $\text{Dom}(X_i)$. That is, an individual state x is also a set of assignments $\{x_1, x_2, \ldots, x_n\}$, such that $x_i \in \text{Dom}(X_i)$.

Dynamic Bayesian Network

The transition model can be represented compactly by means of the DBN 131. The DBN represents an evolution of a probabilistic system, i.e., the power generators, from a one time step t to a next time step t+1. If $X=\{X_1, X_2, \ldots, X_n\}$ is the precursor state of the system at the first time step, and $X'=\{X'_1, X'_2, \ldots, X'_n\}$ is the successor state of the system at the next time step, then the DBN τ has 2n random variables in the set $\{X_1, X_2, \ldots, X_n, X'_1, X'_2, \ldots, X'_n\}$, typically organized in two layers, i.e., a precursor layer and a successor layer.

The transition graph of the DBN $\tau$ can be represented by a two-layer directed acyclic graph, wherein the nodes are the 2n random variables. The parents of node $X'_i$ in the graph of the BDN $\tau$ are denoted by $Parents_\tau(X'_i)$. Furthermore, a conditional probability distribution (CPD) is defined for variable $X'_i$, such that the CPD is conditional only on the variables in $Parents_\tau(X'_i)$: $P_\tau[X'_i|Parents_\tau(X'_i)]$. Then, the entire transition function for the fMDP can be factored as the product of the CPD of individual variables $X'_i$: $P_\tau(x'|x)=\Pi_i P_\tau(x'_i|u_i)$, where $u_i$ is an assignment of $Parents_\tau(X'_i)$ in the value of the state x.

To handle multiple actions a, either a separate DBN is constructed for each action, or individual action variables are included in the DBN, such that the CPD of the variables depend on the action variables, or a subset of the variables.

fMDP Variables

For the purposes of representing a power generation system 100 by the fMDP 130, the following variables are used. The number n of individual state variables is equal to the number of generators N plus one, i.e., n=N+1. Each individual variable $X_i$ represents the state of one generator, and the last variable represents the stochastic power demand, which is also a random variable.

Generator Types

Figure 2:
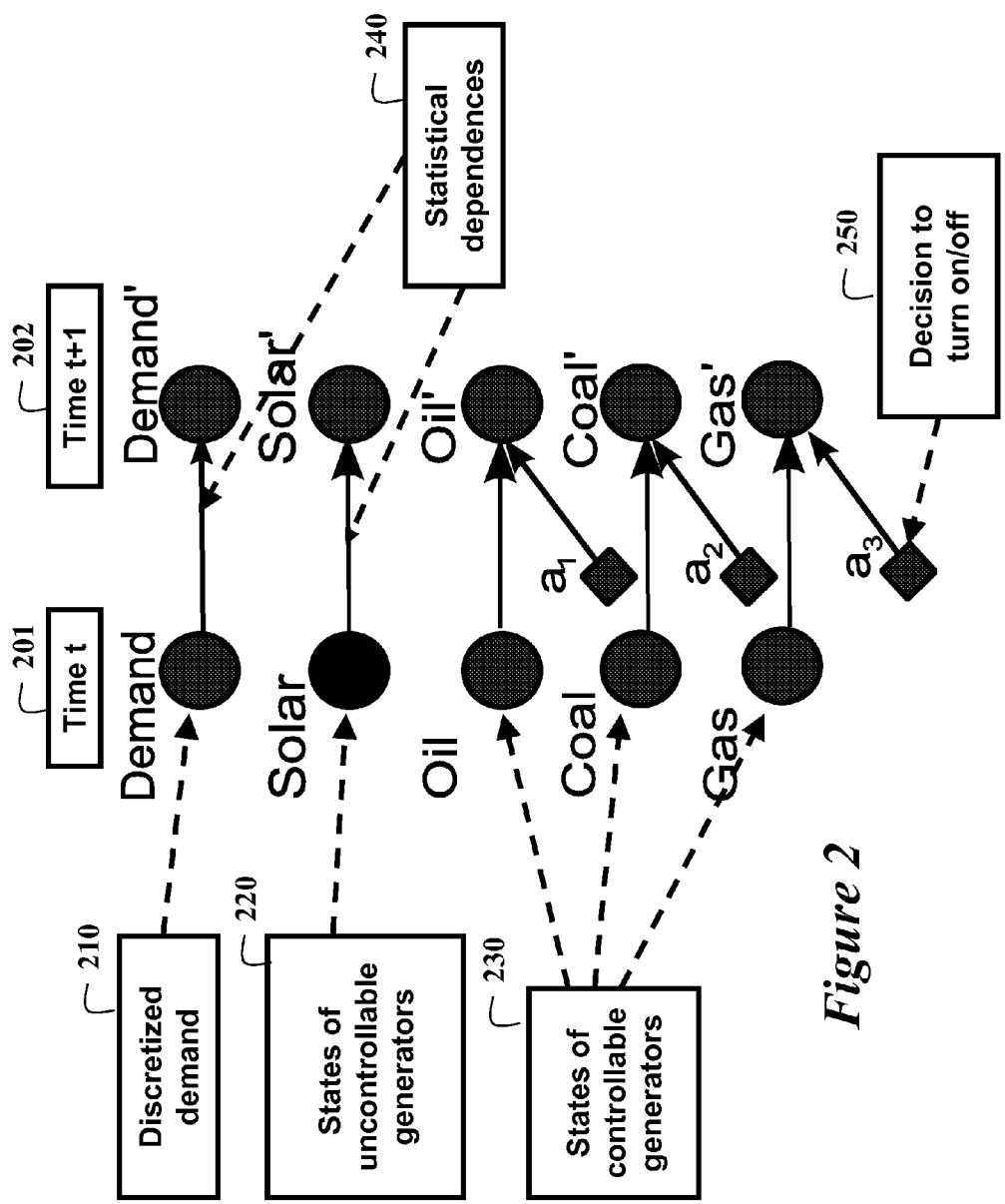
FIG. 2 shows precursor and successor states for controllable and uncontrollable power generators according to embodiment of the invention.

As shown in FIG. 2, there are many types of generators: controllable, e.g., coal, gas, oil, hydroelectric, nuclear, and uncontrollable, e.g., solar and wind. These two types of generators are represented differently in the DBN of the system. FIG. 2 also shows steps at time t 201 and t+1 202, discretized demand 210, the states 220 of the uncontrolled generators, the states 230 of the controllable generators, statistical dependences 240, and a decision (action a) to turn a generator on or off.

Controllable Generators

For a controllable generator i that satisfies constraints regarding minimal/maximal on and off times, as described above, the variable $X_i$ can take on L+l possible different values in the domain set $Dom(X_i)=\{(on, 1), (on, 2), \ldots, (on, L), (off, 1), (off, 2), \ldots, (off, l)\}$.

In the DBN 131, there are two parent nodes of $X'_i$. One parent node is the state $X_i$ of the generator in the precursor state at time t, and the other parent node is the Boolean variable $a_i$ that represents the action to turn generator i on or off in the successor state at time t+1.

The CPD $P_\tau(X'_i|a_i)$ of the variable $X'_i$ represents the time evolution of the state of the generator, e.g., state (on, 1) is followed by (on, 2), if $a_i$=on, or by (off, 1), if $a_i$=off, with probability one, subject to the operating constraints, e.g., (on, L) is followed by (off, 1), regardless of the action $a_i$, when the generator can stay on for at most L time periods. Furthermore, a probability of malfunction can be added to the CPD, such that the state of the generator becomes (off, 1) with a probability equal to the likelihood of malfunction within one time period, regardless of the action $a_i$.

Non-Controllable Generators

A non-controllable generator is always on, but has stochastic variation in output power due to, e.g., varying weather conditions such as wind and sunlight. The random variable $X_i$ represents a difference $\Delta E=E-\bar{E}$ between the actual power output E of the generator and the forecast $\bar{E}$ for its output that is available in advance at the time of scheduling. Note that E and $\Delta E$ are random variables with subsequent observed values that are not known at the time of scheduling, whereas $\bar{E}$ is a known constant at that time. Normally, the difference $\Delta E$ is a continuous variable, and a suitable discretization is performed, either by binning the difference into several discrete intervals, or using a more advanced discretization scheme.

In the DBN, the variable $X'_i$ for such a non-controllable generator has only one parent node $X_i$, and the corresponding CPD $P\tau(X'_i|x_i)$ can be constructed in several possible ways. One possible way is to observe experimental data, and assign the probabilities in the CPD such that $P\tau(X'_i|x_i)=F(\Delta e'|\Delta e)$, where $F(\Delta c'|\Delta c)$ is the frequency of observing difference $\Delta c'$ when the difference in the previous time step was $\Delta e$.

Another way is to assume that the output of the generator is a discrete-time auto-regressive stochastic process of order 1, i.e., (AR(1)), and estimate a single regression coefficient $\rho$ from experimentally observed T residuals $\Delta e_t$, such that $\Delta e_{t+1}=\rho\Delta e_t$, for t=1, ..., T. A suitable value for $\rho$ can be obtained by linear regression so that the equality is satisfied in a least-square sense. After the regression coefficient $\rho$ is obtained, $P_\tau(X'_i|x_i)$ can be determined by means of discretizing the AR(1) process. The last variable, $X_{N+1}$, which represents the probabilistic evolution of power demand, is treated analogously to those representing non-controllable generators. Alternatively, a continuous-time mean-reversal stochastic process can be used.

Reward Function

The reward function R(x, a) of the fMDP is determined as follows. Given a value of the state variable x, let s be the subset of all generators, which are on during the state x. Furthermore, let d be the amount of power demand that corresponds to the demand variable $x_{N+1}$ within x. Then, after solving the economic dispatch problem for this subset of generators and target demand, let F=$f$(s, d) be the cost of meeting the demand with the current set of generators. Furthermore, let G=g(s, d) be the risk, that is, the probability of not being able to meet demand d with the generators in the subset s.

For specific known values of s and d, this risk is completely known, that is, either zero or one. The cost of changing the state of the generators according to the action a at the end of the current time step is H. Then, for a particular risk coefficient $\alpha$ 103, the total reward or cost is $R(x,a)=F+H+\alpha G$.

Solving the fMDP

By specifying all elements of the fMDP, the problem of determining the conditional operational schedule 150 for the power generators 100 is reduced to that of solving the fMDP. The fMDP can be solved by any of known methods for approximate dynamic programming and approximate linear programming The solution is a policy that maps every state of the fMDP to an action within the available set of actions, such that the execution of this action maximizes the defined reward, i.e., minimizes the cost. This policy is the conditional operational schedule for the power generators, and if followed, the policy determines which generator to turn on and off at every time step t, depending on the states of the power generators at the beginning of that time step. Thus, the cost of meeting demand and the risk of not being able to meet the demand are jointly minimized over the planning horizon of M time steps, according to the risk coefficient $\alpha$ 103, which can be user defined.

As shown in FIG. 3, one specific approximate method for solving the fMDP is to restrict the number of states in the fMDP to a reasonable subset, and use AND/OR trees 141 to find the optimal conditional schedule 150. The AND/OR tree include two types of nodes: AND nodes 301, 303, 305, and OR nodes 302 and 304.

The AND nodes represent states that the system can be in at the beginning of a decision period. In this case, the system is described by the triple $(u_t, x_t, d_t)$, where $u_t$ is the configuration (on, off) for all generators at the beginning of time period t, $x_t$ is the state of the controllable generators of the MDP at that time, and $d_t$ is the net demand observed at that time, computed as the difference between the total demand and the output of the uncontrollable power sources. The OR nodes represent decisions that can be made. In this case, the decisions are the configurations $u_t$ that can be chosen at time t.

The root node 301 of the AND/OR tree is always an AND node, and represents the initial state of the system at the time of computing the schedule (t=0). The OR nodes at the second level 302 are the possible configurations that can be chosen for the beginning of the first time period (t=1). The net demand d at the beginning of that period is a random variable, and can take on several values in the set $\{d_1, d_2, \ldots\}$ with various probabilities, as described by the transition probabilities in the DBN 131. Which one demand is taken will become clear at the beginning of the first decision period. This is represented as having multiple descendant AND nodes 303 of the OR node 302 in the AND/OR tree. The tree is expanded further down by adding descendant OR nodes for each possible AND node, etc., until depth equal to the planning horizon is reached.

The optimal schedule can then be computed by means of dynamic programming, as follows. Let $V(u_{t+1}|u_t, x_t, d_t)$ be the value of an OR node corresponding to the configuration decision intended for time t+1, taken when the system is in state $(u_t, x_t, d_t)$ in period t. Also, let $V(u_t, x_t, d_t)$ be the value of the AND node corresponding to that state. Then, the following two dynamic programming equations can be applied in a bottom-up manner, starting from the leaves of the tree and proceeding up to the root of the tree, to determine the value functions of all nodes in the tree:

$$V(u_t, x_t, d_t) = \begin{cases} R(x_T, u_T), & \text{when } t = T \\ \min_{u_{t+1}} V(u_{t+1} | u_t, x_t, d_t), & \text{otherwise} \end{cases}$$

$$V(u_{t+1} | u_t, x_t, d_t) = R(x_t, u_t) + \sum_{d_{t+1}} Pr(d_{t+1} | d_t) V(u_{t+1}, x_{t+1}, d_{t+1}),$$

Where T is the terminal (or last) decision step, and $x_{t+1}$ is the state of the controllable generators that would be assumed if configuration $u_{t+1}$ is chosen for time period t+1.

Once the values of all nodes have been computed, the optimal schedule can be executed as follows. Starting from the initial state 301 $(u_0, x_0, d_0)$, the system is operated in configuration $u_0$. For the next decision period, the scheduler chooses the configuration $u_1$ that corresponds to the OR node 302 with the lowest value function:

$$u_1 = \underset{u_1}{\mathrm{argmin}} V(u_1 | u_0, x_0, d_0)$$

Then, depending on the observed net demand $d_1$ for the first period, the system transitions to one of the AND nodes 303. The choice of configuration then proceeds analogously, always choosing the configuration for the next time period according to:

$$u_{t+1} = \underset{u_{t+1}}{\mathrm{argmin}} V(u_{t+1} | u_t, x_t, d_t)$$

until the end of the planning horizon is reached.

Although this computational method always finds the optimal conditional schedule, it is very complex computationally, because the number of possible configurations that can be chosen at any time period is on the order of $2^N$. Furthermore, the tree also branches on the possible values of net demand. In practice, the branching factor of the tree must be limited to a reasonable number, in order to make the method computationally feasible.

One possible method for limiting the branching factor of the tree is to consider only a small subset of all possible configurations of the generators as candidates for each step. As noted above, a priority list of generators can be used, such that the number of candidate configurations is only N+1.

Another method is to use a known process for generating deterministic schedules, and compute optimal schedules for target demand that varies from expected demand by a given percentage, for example from −10% to +10%. The deterministic scheduler then finds sequences of suitable configurations for each time period and each level of demand. By placing the configurations for the same time period into a single candidate set $U_t$ for the configurations $u_t$, the branching factor of the AND/OR can be limited significantly, and restricted only to configurations that are suitable for likely variations of electricity demand.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining an optimal conditional operational schedule for a set of power generators, comprising the steps of:
    constructing states and transitions of a factored Markov decision process (fMDP) from a target electrical demand and generator variables, wherein the states of the fMDP indicate a number of time steps a state of each power generator in the set is ON or OFF, wherein each transition of the fMDP changes the state of a power generator between ON and OFF states, and wherein the set of power generators includes multiple power generators;
    constructing a cost function for the fMDP based on the electrical demand, the generator variables, and a risk coefficient, such that the cost function is a weighted sum of a cost of meeting the electrical demand and a risk of not meeting the electrical demand; and
    solving the fMDP to obtain the optimal conditional operational schedule, wherein the steps are performed in a processor.

2. The method of claim 1, wherein the demand is stochastic.

3. The method of claim 1, wherein the set of generators includes uncontrollable generators, wherein each uncontrollable generator has a stochastic output.

4. The method of claim 1, wherein the generator variables include a number of the generators, costs, and constraints for operating the generators.

5. The method of claim 1, wherein the fMDP is represented by a dynamic Bayesian network (DBN).

6. The method of claim 5, wherein the DBN represents an evolution of the power generators from a time step t to a next time step t+1, and wherein $X=\{X_1, X_2, \ldots, X_n\}$ is a precursor state at the time t, and $X'=\{X'_1, X'_2, \ldots, X'_n\}$ is a successor state at the time t+1.

7. The method of claim 5, wherein the DBN is represented by a two-layer directed acyclic graph.

8. The method of claim 1, wherein the solving uses approximate dynamic programming.

9. The method of claim 1, wherein the states of the fMDP are represented by a set of random variables $X=\{X_1, X_2, \ldots X_n\}$, where each state variable $X_i$ has values in a finite domain $Dom(X_i)$, and an individual state x has a set of assignments $\{x_2, x_n, \ldots, x_n\}$, such that $x_i \in Dom(X_i)$.

10. The method of claim 1, wherein the solving of the fMDP uses an AND/OR tree and dynamic programming.

11. The method of claim 10, wherein branching of the AND/OR tree is limited to a subset of suitable configurations of the controllable generators.

12. The method of claim 11, wherein the subset of suitable configurations of the controllable generators is constructed by priority list for the generators.

13. The method of claim 11, wherein the subset of suitable configurations of the controllable generators is constructed by executing deterministic schedulers for varying levels of demand around an expected value of the demand, and observing which configurations are used in the optimal conditional operational schedules.

14. The method of claim 11, wherein a net demand is computed by subtracting the output of all uncontrollable variables from a total demand.

15. The method of claim 11, wherein the demand variable is discretized and limited to only a number of possible discrete values.

16. The method of claim 15, wherein a probabilistic transition function of the net demand variable is estimated from a discrete-time auto-regressive stochastic process.

17. The method of claim 15, wherein the probabilistic transition function of the net demand variable is estimated from a continuous-time mean-reversal stochastic process.

18. The method of claim 1, wherein the cost function R(x, a) is $$R(x,a)=F+H+\alpha G,$$

wherein F is the cost of meeting the electrical demand, H is a cost of changing the state x of the power generator according to an action a, G is the risk of not meeting the electrical demand, and $\alpha$ is risk coefficient.

* * * * *